Aug. 11, 1970  R. D. JACOBSON  3,523,619

BIN CONSTRUCTION

Filed Feb. 3, 1969  4 Sheets-Sheet 1

INVENTOR.
Rodney D. Jacobson
BY
Merchant & Gould
ATTORNEYS

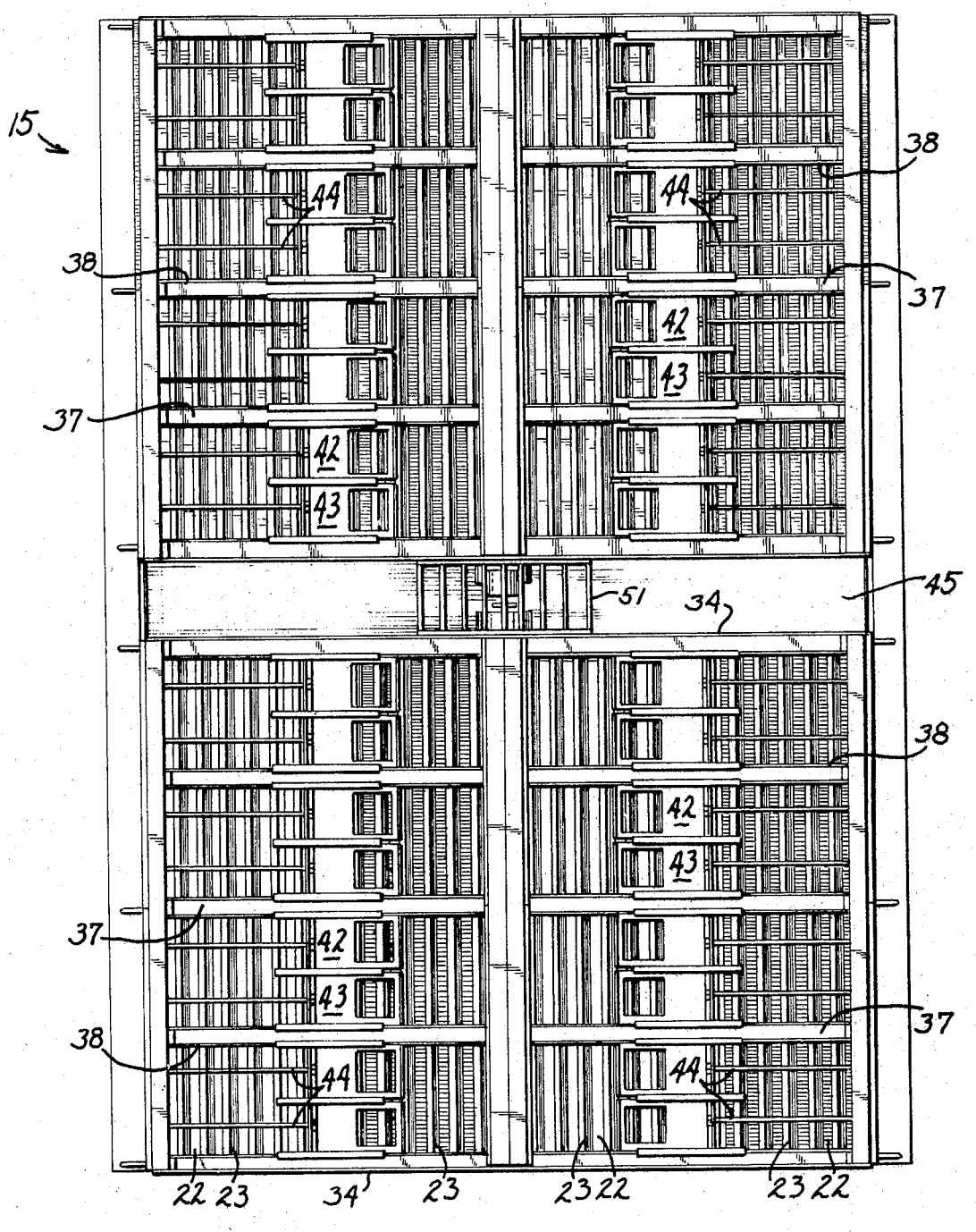

Aug. 11, 1970  R. D. JACOBSON  3,523,619
BIN CONSTRUCTION

Filed Feb. 3, 1969 4 Sheets-Sheet 3

INVENTOR.
Rodney D. Jacobson
BY
Merchant & Gould
ATTORNEYS

Aug. 11, 1970  R. D. JACOBSON  3,523,619
BIN CONSTRUCTION

Filed Feb. 3, 1969  4 Sheets-Sheet 4

INVENTOR.
Rodney D. Jacobson
BY
Merchant & Gould
ATTORNEYS

United States Patent Office 3,523,619
Patented Aug. 11, 1970

3,523,619
BIN CONSTRUCTION
Rodney D. Jacobson, Ray, N. Dak., assignor to Jacobson and Sons Construction Co., Inc., Ray, N. Dak., a corporation of North Dakota
Filed Feb. 3, 1969, Ser. No. 795,985
Int. Cl. B65g 3/20
U.S. Cl. 214—16                    1 Claim

ABSTRACT OF THE DISCLOSURE

Lower side walls formed in a generally downwardly converging configuration and upper side walls joined in a generally upwardly converging configuration affixed thereto with generally rectangular end walls to form an enclosure having a framework affixed thereto for mounting said enclosure above the ground for the movement of transporting vehicles therebelow and an auger mounted adjacent the apex of said enclosure for introducing and distributing material therein to be stored and with an opening having closure means thereover adjacent the juncture of the lower walls so that the stored material can be removed therefrom through the force of gravity.

BACKGROUND OF THE INVENTION

Field of the invention

In the storage of materials, such as grains, fertilizers, and the like, it is generally the practice to provide storage bins which are easily accessible for the placement of material to be stored therein and for the later removal. It is imperative that these bins be weather tight but relatively inexpensive and durable.

Description of the prior art

In the prior art storage bins are generally constructed of metals, such as corrugated steel and the like, and are usually constructed so that the floor thereof rests on the ground, or with only a small space therebetween. This is undesirable because extra equipment is required to remove the material from the bin and load it into transporting vehicles. Also, the metal materials forming the bin are highly susceptible to the chemicals found in fertilizers and the like.

SUMMARY OF THE INVENTION

The present invention pertains to an improved storage bin including an enclosure formed from generally downwardly converging lower side walls, generally upwardly converging upper side walls affixed thereto, and generally rectangular end walls affixed to both ends thereof with means mounted adjacent the juncture of said upper side walls for introducing and distributing material to be stored therein and openings defined by said lower side walls adjacent the lower extremities thereof with means operable to close said openings for allowing the stored material in the enclosure to egress therefrom under the force of gravity.

It is an object of the present invention to provide a new and improved storage bin.

It is a further object of the present invention to provide a storage bin which is relatively inexpensive to construct and which is more durable than prior art storage bins.

It is a further object of the present invention to provide storage bins which are formed and mounted so that the material stored therein can be quickly and easily removed therefrom and transferred directly into transport vehicles without the use of unloading and loading equipment.

These and other objects of this invention will become apparent to those skilled in the art upon consideration of the accompanying specification, claim, and drawings.

BRIEF DESCRIPTION OF THE DRAWINGS

Referring to the drawings, wherein like characters indicate like parts throughout the figures:

FIG. 3 is an enlarged view in bottom plan of the storage bin illustrated in FIG. 1;

DESCRIPTION OF THE PREFERRED EMBODIMENTS

Figure 1:
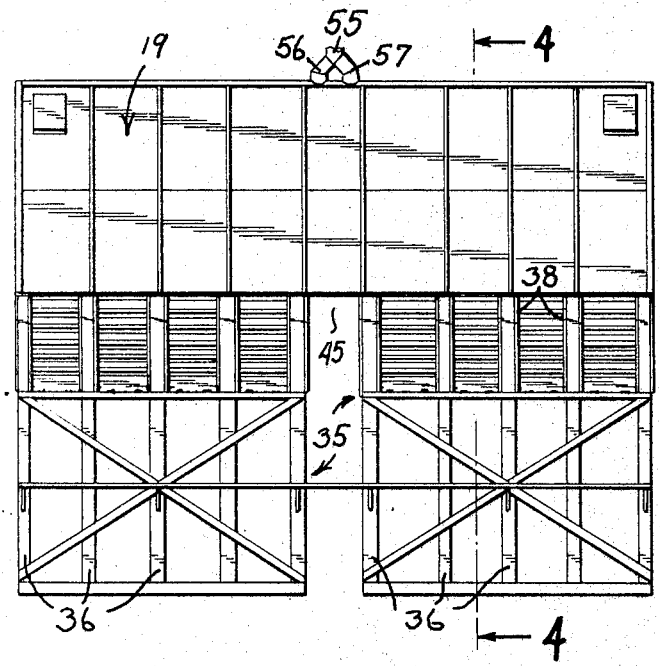
FIG. 1 is a view in side elevation of an improved storage bin.
Figure 2:
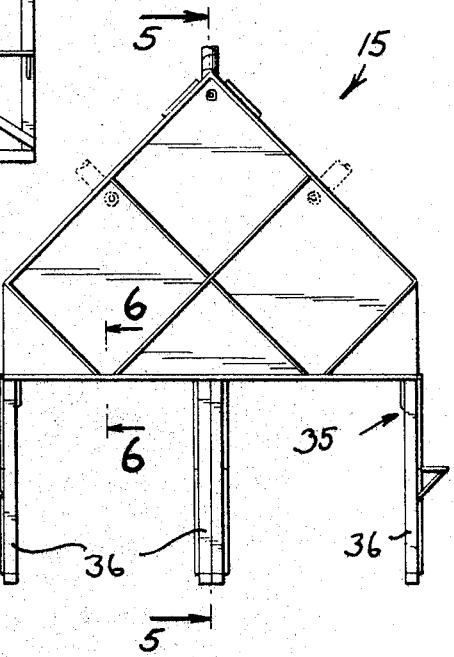
FIG. 2 is a view in end elevation of the improved storage bin as seen from the right end in FIG. 1.

Referring to the figures the numeral 15 generally designates an improved storage bin having three enclosures or compartments 16, 17 and 18 positioned in a generally inverted V-shape, (see FIG. 4) and three similar compartments (no internal view shown) spaced axially therefrom and designated generally by 19. It should be understood that a plurality of compartments are illustrated in the present embodiment of the storage bin 15 but that a single compartment might be utilized if desired. Also, while the present embodiment illustrates three enclosures formed into a generally inverted V-shape, it should be understood that additional units might be added, utilizing the construction which will be explained presently, if desired.

Compartment 16 is formed with a pair of lower side walls 20 and 21 positioned in a generally downwardly converging configuration. Each of the lower side walls 20 and 21 are constructed with a plurality of sheets of material 22 (this may be one sheet if the compartment 16 is small enough) positioned in a common plane and forming the inner surface thereof. A plurality of parallel horizontally spaced apart beams 23 are affixed to the under side of the sheets of material 22 so as to extend the length of the compartment 16 and provide support therefor. The downwardly converging lower side walls 20 and 21 are spaced apart adjacent the lower extremities to define an opening 24 therebetween, which opening 24 extends substantially the length of the compartment 16.

The compartment 16 has a pair of upper side walls 30 and 31 joined together in a generally upwardly converging configuration and attached to the outermost extremities of the lower side walls 20 and 21. The upper side walls 30 and 31 each have braces 32 positioned in supporting engagement with a sheet of material 33, which sheet of material 33 forms the outer surface thereof. Two generally rectangularly shaped end pieces 34 are attached to the ends of the lower side walls 20-21 and upper side walls 30-31 to form the enclosure or compartment 16. In the present embodiment the lower side walls 20–21, the upper side walls 30–31, and the end pieces 34 are all formed of wood or wood products so that certain materials, such as fertilizers and the like, may be stored in the compartment 16 with little or no corrosive effect thereon.

The compartment 16 is held in the desired position and configuration by means of a framework generally designated 35. The framework 35 includes a plurality of vertically extending legs 36 spaced apart horizontally along the axial length of the compartment 16 and affixed to the under side of the lower side walls 20 and 21 adjacent the outermost extremities in a generally downwardly extending relation therefrom. The legs 36 extending downwardly from the lower side walls 20 and 21 form pairs and horizontal cross beams 37 extend therebetween in a position so as to engage the lowermost extremities of the lower side walls 20 and 21 adjacent the opening 24 and maintain the lower side walls 20 and 21 in the desired position. The upper portion of the legs 36 and cross beams 37 are partially enclosed by truncated generally triangularly shaped pieces of material 38 affixed to both sides of the legs 36, cross beams 37 and the under side of the lower side walls 20 and 21.

Figure 6:
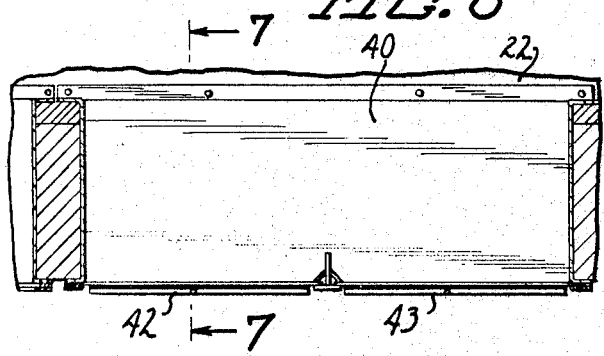
FIG. 6 is an enlarged sectional view as seen from the line 6—6 in FIG. 2, portions thereof removed.
Figure 7:
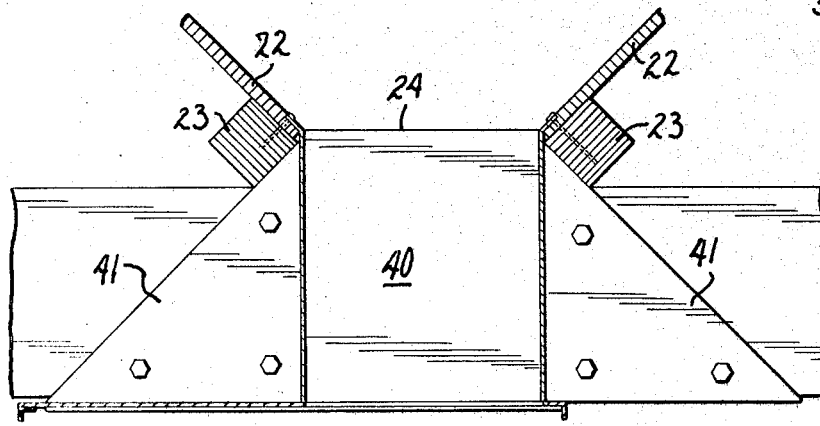
FIG. 7 is an enlarged sectional view as seen from the line 7—7 in FIG. 6, portions thereof removed.
Figure 4:
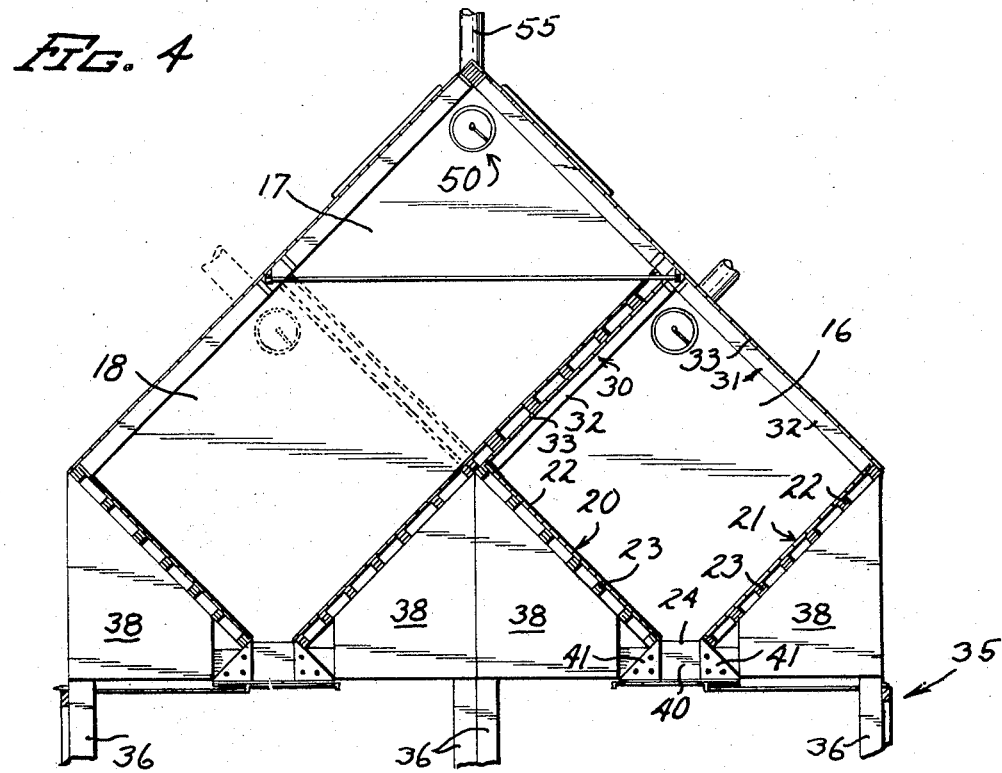
FIG. 4 is an enlarged sectional view as seen from the line 4—4 in FIG. 1, portions thereof removed.

A plurality of chutes 40 each having a generally rectangularly shaped opening therein are affixed to the lower edges of the lower side walls 20 and 21 so as to be in communication with the opening 24 (see FIGS. 4, 6 and 7). A chute 40 is connected to the lower edges of the lower side walls 20 and 21 and between each of the cross beams 37 along the entire length of the compartment 16. The chutes 40 are connected to the cross beams 37 by means of outwardly extending fillets 41, which are bolted to the beams 37 on both sides of the chute 40 and at each end thereof. In this embodiment the chutes 40 are constructed of metal and each have a pair of doors 42 and 43 mounted in a horizontal plane therebelow. Each of the doors 42 and 43 are slightly longer than twice the width of the opening through the chute 40 with blank portions and openings therethrough corresponding in size to the opening in the chute 40. The doors 42 and 43 are mounted for horizontal sliding movements so that alignment of the blank portion thereof with the chute 40 allows the material in the compartment 16 to egress therethrough. Each of the doors 42 and 43 have a rod 44 extending therefrom to the outer edge of the framework 35 so that an operator standing at one side of the framework 35 can open any or all of the doors 42 and 43.

While it should be understood that the compartment 16 could be utilized as a storage bin without the addition of further compartments, the two additional compartments 17 and 18 have been added thereto to illustrate the manner in which this is accomplished. Further, a set of three similar compartments 19 have been added longitudinally onto one end of the three compartments 16 through 18. The compartment 18 is constructed and mounted similar to the compartment 16. A third compartment 17 is mounted between the compartments 16 and 18 so that the upper side walls lie in a plane with the outermost upper side walls of the compartments 16 and 18 and the entire structure forms a generally inverted V or wedge shape. One lower side wall of the compartment 17 overlies the upper side wall 30 of the compartment 16 and forms a substantially continuous wall with the adjacent lower side wall of the compartment 18. The opposite lower side wall of the compartment 17 and the underlying upper side wall of the compartment 18 (shown in dotted lines) are removed so that the compartments 17 and 18 are in communication throughout the length thereof. It should be understood that additional compartments can be added in a similar fashion and such compartments can be in communication with compartments 16 or 18 and with each other by eliminating adjacent walls, so that any particular storage unit can be constructed as large as desired. Further, the expense of adding additional compartments is greatly reduced because adjacent walls are removed and only a small amount of additional material is required for each additional compartment.

Figure 5:
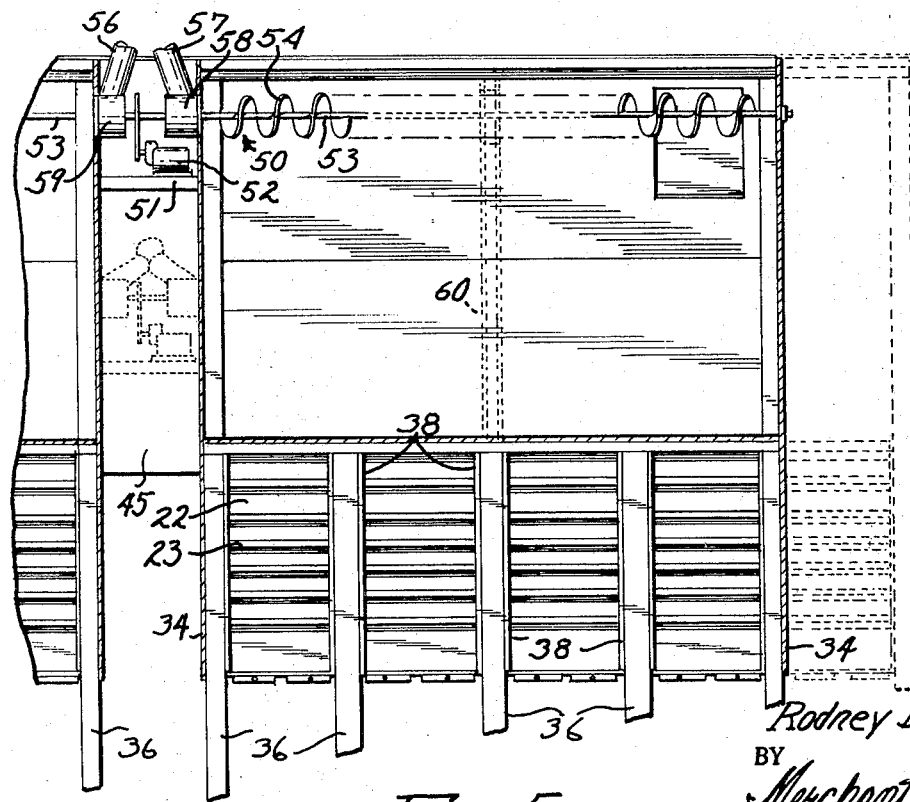
FIG. 5 is a sectional view as seen from the line 5—5 in FIG. 2, portions thereof removed.

Each compartment or storage unit (when two compartments are joined as compartments 17 and 18) has mounted therein an auger-type introducing and distributing system generally designated 50. It should be understood that many other types of systems might be utilized for introducing the material into the storage compartments and distributing it throughout, but the present auger systems 50 are illustrated because of their simplicity and dependable operation. In this embodiment the first set of compartments 16, 17 and 18 and the second set of compartments 19 are spaced apart longitudinally to provide an opening 45 therebetween and the sheets of material 33 forming the outermost upper side walls overlie the opening 45 to provide a roof thereover. Referring to FIG. 5 a platform 51 having a motor 52 mounted thereon is illustrated in the opening 45 between sets of compartments. The motor 52 is operatively connected to a shaft 53 which extends longitudinally through compartment 17 and the uppermost compartment in the set of compartments 19 longitudinally spaced from the compartment 17. The shaft 53 forms a portion of an auger 54 in the compartment 17 and a similar auger (not shown) in the longitudinally spaced apart compartment. A material-feed conduit 55 is bifurcated to form a pair of feed conduits 56 and 57 which are in communication with feed boxes 58 and 59, respectively, at the ends of the auger 54 and the other auger on the shaft 53. Thus, the material entering the feed conduit 55 is distributed substantially equally into the storage unit formed by compartments 17 and 18 and the storage unit in the set 19 displaced axially therefrom. If it is desired to store different materials in the two compartments the conduits 56 and 57 would not be joined but would lead to different sources of supply. A similar auger system 50 is illustrated in compartment 16 and a similar system 50 is also shown in dotted lines in compartment 18 for use when, or if, the side walls, shown in dotted lines, are installed.

Figure 8:
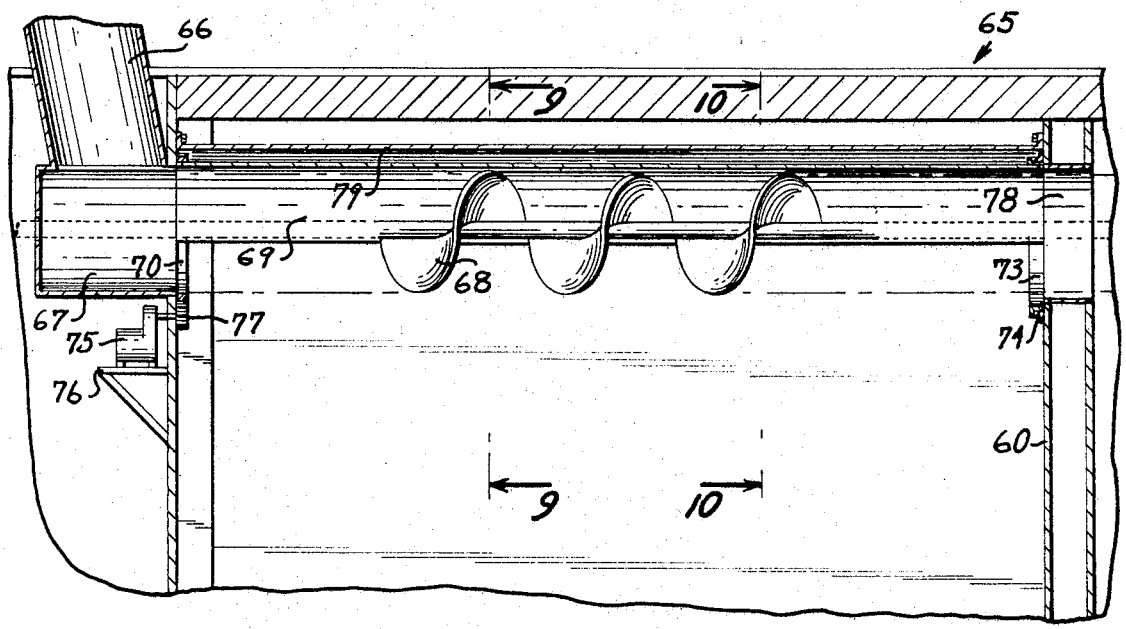
FIG. 8 is an enlarged fragmentary view similar to a portion of FIG. 5, illustrating another embodiment of an auger.
Figure 9:
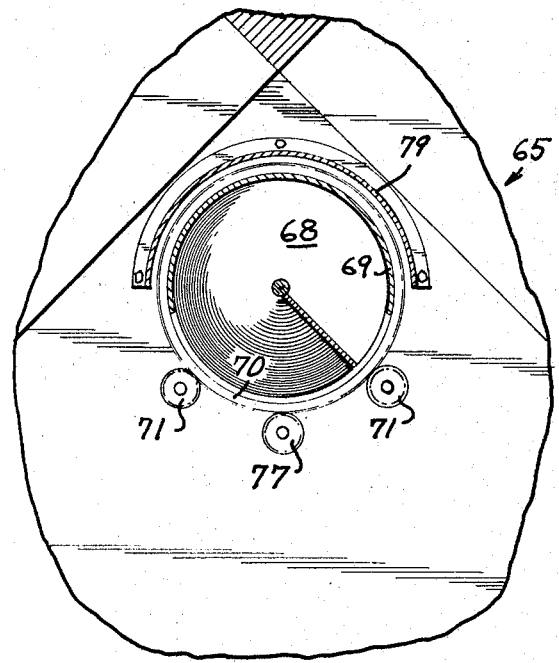
FIG. 9 is an enlarged sectional view as seen from the line 9—9 in FIG. 8.
Figure 10:
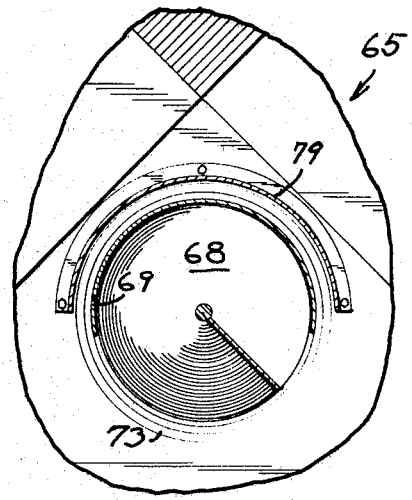
FIG. 10 is an enlarged sectional view as seen from the line 10—10 in FIG. 8.

In many instances an entire compartment, such as 16 through 18, may be too large to store the amount of material desired and additional walls, such as vertically extending wall 60 (shown in dotted lines in FIG. 5) can be constructed in a compartment to divide the compartment into small storage units. However, when such a division of a compartment is performed, the simple auger system 50 illustrated in FIG. 4 and 5 will not suffice. While many systems can be devised for introducing and distributing the material to be stored in the various storage units, a modified auger system generally designated 65 is illustrated in FIGS. 8–10. The modified auger system 65 includes an inlet conduit 66 in communication with a feed box 67 mounted at one end of an auger 68 so that material from the inlet conduit 66 enters the feed box 67 and is removed therefrom by the auger 68 to be distributed in the adjacent compartment or storage unit. A semi-cylindrical member 69 is mounted coaxial with the auger 68 for rotation therearound. The semi-cylindrical member 69 has a ring 70 affixed coaxially thereto at one end and gear teeth are formed in the outer periphery of said ring 70. The ring 70 is mounted for rotation by means of a pair of idler gears 71 rotatably mounted therebelow. The opposite end of the member 69 has a ring 73 affixed thereto which slidably engages a ring 74 fixedly mounted on the compartment wall. A motor 75 is mounted on a shelf 76 in the opening 45 with the shaft thereof extending through the compartment wall and gear 77 affixed thereto within the compartment. The gear 77 engages the ring 70 in a driving relationship so that rotation of the gear 77 causes rotation of the ring 70. Operation of the motor 75 causes rotation of the semi-cylindrical member 69 about the auger 68. When the member 69 is in the position shown above the auger 68 material entering the inlet conduit 66 drops into the compartment immediately below the auger 68. When the motor 75 is energized to move the member 69 below the auger 68 material is carried through the compartment below the auger 68 and passes through an opening 78 in the wall of the compartment into the adjacent compartment. A matching semi-cylindrical member 79 is fixedly attached in a coaxial position above the auger 68 so as to cooperate with the member 69 to prevent material from being pushed over the edges thereof into the compartment below the auger 68 during the augering operation. It should be understood that similar augering systems could be provided in adjacent compartments to carry material through several compartments if desired.

Thus, an improved storage bin is disclosed wherein compartments and storage units of substantially any desired size can be provided. The length of the compartments can be varied by adding additional sections (see dotted lines in FIG. 5) and the number and size of storage units in any bin can be varied by the inclusion or exclusion of side walls or dividing walls. The material stored in the bins is quickly and easily removed by means of the openings at the bottoms thereof and the material to be stored can be introduced and distributed by any desired means. Removable doors 80 are provided in the upper walls of the compartments so that the various compartments are easily accessible for repair and maintenance or the use of other types of material introducing and distributing apparatus.

What is claimed is:
1. An improved storage bin comprising:
    (a) a plurality of enclosures each including
        (1) lower side walls formed in a generally downwardly converging configuration,
        (2) upper side walls joined together in a generally upwardly converging configuration and affixed to the lower side walls adjacent the outwardly extending ends thereof,
        (3) generally rectangular end walls affixed to said lower and upper side walls adjacent both ends thereof to form an enclosure,
        (4) means mounted adjacent the juncture of said upper side walls for introducing and distributing material to be stored in said enclosure,
        (5) said lower side walls further defining at least one opening adjacent the lower extremities thereof for removing the stored material from said bin, and
        (6) means mounted adjacent the opening defined by said lower side walls for closing said opening and operable to allow desired amounts of stored material to egress through said opening; and
    (b) said plurality of enclosures being affixed together in a generally inverted V configuration with the upper enclosures in communication with at least one lower enclosure for allowing stored material to flow therebetween.

References Cited

UNITED STATES PATENTS

| | | | |
|---|---|---|---|
| 1,576,940 | 3/1926 | Warner | 52—194 |
| 3,319,807 | 5/1967 | Van Raden | 214—16 |

ROBERT G. SHERIDAN, Primary Examiner

U.S. Cl. X.R.

52—194, 197